United States Patent [19]
Griffin et al.

[11] Patent Number: 5,323,867
[45] Date of Patent: Jun. 28, 1994

[54] ROBOT TRANSPORT PLATFORM WITH MULTI-DIRECTIONAL WHEELS

[75] Inventors: Eric J. Allard, 17614 Lahey St., Granada Hills, Calif. 91344; Ronald Griffin, Agua Dulce, Calif.

[73] Assignee: Eric J. Allard, Granada Hills, Calif.

[21] Appl. No.: 847,627

[22] Filed: Mar. 6, 1992

[51] Int. Cl.$^5$ .................. B62D 5/02; B62D 11/08
[52] U.S. Cl. ........................... 180/22; 301/5.023
[58] Field of Search .................. 180/7.1, 22, 6.2, 6.54, 180/6.48; 301/5.23, 5.1, 1; 305/60, 6, 7

[56] References Cited

U.S. PATENT DOCUMENTS

| | | | |
|---|---|---|---|
| 1,305,535 | 6/1919 | Grabowiecki | 301/5.23 |
| 3,465,843 | 9/1969 | Guinot | 301/5.23 |
| 3,789,947 | 2/1974 | Blumrich | 301/5.23 |
| 4,101,004 | 7/1978 | Oltman | 180/6.2 |
| 4,168,468 | 9/1979 | Mabuchi et al. | 180/6.5 |
| 4,335,899 | 6/1982 | Hiscock | 301/5.23 |
| 4,621,562 | 11/1986 | Carr et al. | 180/6.48 |
| 4,823,900 | 4/1989 | Farnam | 301/5.23 |

Primary Examiner—Edwin L. Swinehart
Attorney, Agent, or Firm—Jeffrey J. Blatt

[57] ABSTRACT

A robot transport platform adapted for locomotion, having a base with three wheels on each side. Of the three wheels on each side, the wheels near the fore end and the aft end are omnidirectional wheels; the intermediate wheel in between the omnidirectional wheels is a conventional wheel. The omnidirectional wheels have staggered rows of spherical rollers rotatably mounted to the circumference of the wheel's hub. More precisely, the rollers are mounted to annular shafts that circumscribe the circumference of the hub, and are supported in an overlying position over the hub by radially extending spokes. Anti-rattle washers are provided in between adjacent rollers. Torque is provided by two electric motors independently operating the wheels on each side. Torque is transferred to the wheels via a gear box, a chain, and cogged drive belts. The robot transport platform is controlled by radio and accordingly has a radio receiver mounted to the base. Servo controllers are used to control the motors and gear box. Batteries are supplied to power the electrical hardware. In alternative embodiments, the shape of the rollers can be cylindrical, diamond shaped, or an ovoid. In another alternative embodiment, the transport platform can be powered by an internal combustion gasoline or diesel engine.

3 Claims, 4 Drawing Sheets

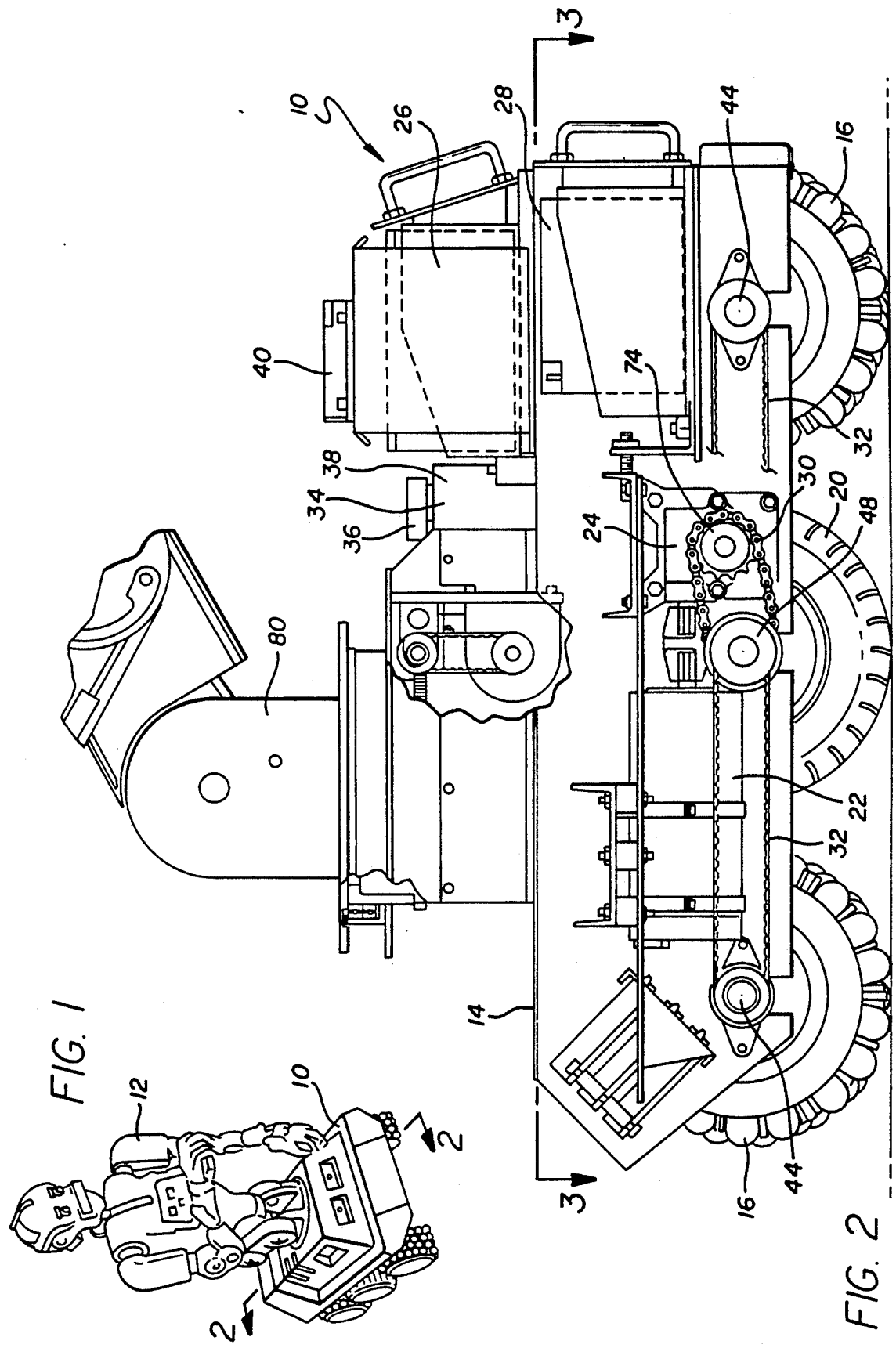

ROBOT TRANSPORT PLATFORM WITH MULTI-DIRECTIONAL WHEELS

BACKGROUND OF THE INVENTION

Field of the Invention

The present invention relates to a mobile robot transport platform. More precisely, the present invention relates to a robot transport platform using omnidirectional wheels in combination with conventional wheels.

Description of Related Art

Mobile robots have found use in a variety of applications. Aside from the movie industry, which often portrays robots capable of highly agile locomotion, robots are used for hazardous waste disposal, attending to radioactive components in nuclear power plants, assisting police bomb squads on dangerous missions, working with firefighters, exploring underwater or outerspace environments, acting as a security or military sentry, or even functioning as a pipe crawler to check for continuity in lengthy pipelines.

A variety of transport systems have been developed to provide mobility to robots. A simple and commonly found transport system comprises an undercarriage or platform upon which the robot is transported, wherein the platform is supported by a row of wheels positioned on either side of the platform. In another configuration, the wheels are replaced by tank tracks. The tank track, as is commonly known, is a continuous, flexible tread passing over cogged wheels turning inside the tread. In a more interesting transport system, the tank tracks are substituted by outstretched, articulating legs. The movement of these legs are actuated by a network of springs, solenoids, dampers and the like.

The three above-mentioned methods of locomotion, among others, are described in "A Compendium of Robotic Equipment Used in Hazardous Environments", published in February 1990, by EPRI Maintenance Equipment Applications Center, and J. A. Jones Applied Research Company, in Charlotte, N.C. For example, on page 2-81, a robot transport carriage using six conventional wheels is shown. On page 2-39, a robot transport carriage using tank tracks is shown. On page 2-151, a robot transport system using legs is shown.

Several patents also disclose technology related to the present invention. U.S. Pat. No. 4,621,562 to Carr et al. discloses a remote control, six-wheel robot vehicle having a chassis with three wheels positioned on either side. All six wheels are conventional in design.

U.S. Pat. No. 4,993,912 to King et al. discloses a stair climbing robot. To achieve the stair climbing capability, the robot features a chassis having powered, opposed front wheels and two pairs of rear wheels, with each pair being rotatably mounted on a beam at opposite ends thereof. Furthermore, each beam is itself rotatably mounted on the chassis. Since the rear wheels are mounted on a rotatable beam, one wheel of the pair can be lifted off the ground and displaced over the the other, more forward wheel. Through this rear-wheel-over-front-wheel hopping motion, it is possible for the chassis to climb ascending steps.

There have been other attempts at improving the maneuverability of mobile platforms and systems, although the following examples are not specifically directed to robot transport platforms. U.S. Pat. No. 4,715,460 to Smith discloses a wheelchair base using three wheels oriented in a triangular layout. To form the triangle, two of the wheels are substantially parallel and located on opposite sides of the base while the third wheel is located at one end of the base and oriented 90° relative to the other two wheels. Smith also provides that each wheel be omnidirectional. An omnidirectional wheel has disposed around its circumference a plurality of rollers. The axes of rotation of the rollers correspond to chords on the circumference of the wheel. Thus, the rollers enable the omnidirectional wheel to rotate conventionally along the circumference; or unconventionally, by using the rollers to travel in a lateral direction perpendicular to the conventional rolling direction of the wheel.

The concept for an omnidirectional wheel is not novel. U.S. Pat. No. 3,789,947 to Blumrich discloses an omnidirectional wheel. U.S. Pat. No. 4,223,753 to Bradbury also discloses an omnidirectional wheels. In Bradbury, a transport device is supported by omnidirectional wheels on all sides, or on two sides with another two sides being track driven.

The foregoing transport platforms have severe limitations when required to pivot in place, however. For example, for a transport platform using two rows of three wheels on either side, driving the oppositely disposed wheels in opposite directions allows the carriage to pivot in place. But the outer wheels near the ends of the platform tend to drag along the surface of the ground. The drawbacks of having to overcome frictional resistance of the ground are plain. Namely, more energy is required to pivot the transport. The pivoting action cannot, accordingly, be achieved quickly because friction must first be overcome. Also, because of friction, wear and tear to the wheels and the ground occur, and are clearly undesirable.

By replacing several of the conventional wheels on a multi-wheel transport platform with omnidirectional wheels, the dragging problem is somewhat eliminated. Thus, the transport device of Bradbury and the omnidirectional vehicle base of Smith do not have the frictional resistance phenomenon during pivoting maneuvers. To be sure, these vehicles rely on small rollers embedded in the circumference of the wheel, as mentioned above.

But the Bradbury and Smith designs also have their disadvantages. Both designs provide for an omnidirectional wheel that is located at the front of the platform. If the platform moves forward, the front omnidirectional wheel is in an awkward position, being oriented 90 degrees relative to the direction of travel of the platform. Accordingly, the front omnidirectional wheel must move on the embedded rollers. But the small diameters of the rollers inhibit the speed at which the transport platform can move. The omnidirectional wheels disclosed in Smith, Bradbury and Blumrich also require many parts and fairly complex hardware to function.

Therefore, a need presently exists for a transport platform that utilizes omnidirectional wheels and is capable of high speed travel. Ideally, the omnidirectional wheels should improve mobility yet not inhibit travel speed in any direction. The omnidirectional wheels should also be of a simple construction to assure reliable operation.

SUMMARY OF THE INVENTION

The present invention is directed to a transport platform employing a combination of omnidirectional wheels with conventional wheels in such an arrangement that straight-line movement is not hindered by the omnidirectional wheels, and pivoting motion is not hindered by the conventional wheels.

In a preferred embodiment, the present invention provides a transport platform for providing locomotion to a robot manipulator or similar device. The platform features three wheels stationed on opposite sides of the platform base. On each side, two of the wheels are omnidirectional wheels, and in between the omnidirectional wheels on each side is a conventional wheel.

The omnidirectional wheels differ from a conventional wheel primarily in the structure of the tread at the circumference. As is well known, the tread on a conventional wheel is comprised simply of grooves or other formations disposed on the outer circumference of the wheel. But in the omnidirectional wheel of the present invention, the tread has been replaced by a plurality of rollers located around the circumference. These rollers are free to turn about their respective axes of rotation, which axes are tangential and coplanar with a circumference of the omnidirectional wheel. The rollers are constrained, however, from revolving in a circumferential direction on the omnidirectional wheel. By constraining the rollers in this direction, it is possible for the omnidirection wheel to rotate and function as a conventional wheel.

In the preferred embodiment, the rollers are actually rubber balls that are mounted to several annular shafts that circumscribe the wheel hub. The annular shafts are supported by radially extending spokes that project out of the cylindrical hub.

As the omnidirectional wheel is loaded, the weight is distributed at first on the hub, and then on the spokes, which translate the load to the annular shaft, which shaft translates the load to the rubber balls. So when the omnidirectional wheel is placed in motion, circumferential rolling action is achieved as in a conventional wheel by rolling on the plurality of balls. Since each ball is constrained from rotating in the circumferential direction, grip or traction is provided by the balls.

On the other hand, lateral translation of the omnidirectional wheel in a direction parallel to the wheel's axis of rotation is achieved by sliding the wheel sideways, which motion causes the individual balls to revolve around their respective axes of rotation. Hence, this translational movement in a direction perpendicular to the wheel's direction of rotation is facilitated by rolling on the individual balls.

When combined with a pair of conventional wheels as taught by the present invention, the omnidirectional wheels bring another degree of mobility to transport platforms. Indeed, the lateral sliding capability of the omnidirectional wheel when arranged according to the present invention permits the entire transport platform to pivot or spin in place. To initiate this action, any one of the three wheels to one side of the platform base can rotate in one direction, while the wheels on the opposite side rotate in the reverse direction. The two coordinated wheel rotations cause the platform to pivot either clockwise or counterclockwise without any linear displacement.

By comparison, in conventional six-wheel platforms as described above, this type of motion would cause the wheels located at the farthest point from the center of the rotational circle to skid along the ground. The present invention has no such problem by virtue of the omnidirectional wheels.

Furthermore, since the present invention does not have a wheel located at the front or rear as shown in Smith or Bradbury, discussed above, straight-line velocity of the platform is not inhibited. The unique combination of conventional and omnidirectional wheels of the present invention gives the platform high mobility without limiting its straight-line speed.

In many prior art six-wheel vehicles, to avoid skidding of the outboard wheels during a spinning maneuver, the intermediate wheels are positioned lower to the ground than the wheels located farther out near the ends of the platform. Although this technique is somewhat effective, wheel drag nevertheless occurs.

The present invention platform, by comparison, does not need to elevate the outboard wheels to avoid wheel drag. The reason is that the present invention benefits from not only the rollers to facilitate lateral sliding of the omnidirectional wheels, but also the arrangement of the the rollers relative to one another. In particular, the rollers are mounted in a staggered relationship, which further enhances lateral sliding of the omnidirectional wheel with minimal frictional resistance from the ground.

In addition, because the rollers are constrained to not spin in the circumferential direction, the omnidirectional wheel when rotating in that direction has complete grip of the ground through these rollers. This sort of traction is conducive to high angular velocities for the omnidirectional wheel.

Moreover, the transport platform having the present invention arrangement of omnidirectional wheels and conventional wheels benefits from high maneuverability. Indeed, the transport platform is capable of high speed linear starts and stops, high speed pivoting spins, or even a combination of the two wherein the platform traverses linear distances interspersed by quick and agile pivoting motions.

Since lateral resistance to pivoting motion is nearly obviated, the present invention requires very low energy input to accomplish the maneuver. Likewise, during a pivoting maneuver, starts and stops can be accomplished almost instantaneously with speed and precision.

Since the present invention platform does not drag the outboard wheels over the ground during its pivoting motion, there is very little damage to the terrain. This is a key advantage especially if the invention is used indoors for travel over carpeting, delicate wood floors, tiles, etc. By the same token, there is very little wear and tear to the outboard wheels, motor, and drive train. Reliability of the mechanism should improve and maintenance requirements should decrease.

It is therefore an object of the present invention to provide a transport platform that incorporates omnidirectional wheels with conventional wheels to obtain high speed straight-line motion along with pivoting maneuvers. It is another object of the present invention to provide a transport platform that is capable of starting and stopping quickly and precisely either from straight-line or pivoting motion. It is yet another object of the present invention to provide a transport platform that consumes very low energy to achieve a pivoting maneuver. It is still yet another object of the present invention to provide a transport platform that can be adapted to a variety of uses, such as for locomotion of robots, carrying a load, working in underwater or planetary exploration, replacing the function of the four wheels on a conventional automobile, or the like.

BRIEF DESCRIPTION OF THE DRAWINGS

FIG. 1 is a pictorial perspective view of the present invention transport platform adapted to provide locomotion to a robot.

FIG. 2 is a cross-sectional view of the present invention transport platform taken along line 2—2 of FIG. 1.

DETAILED DESCRIPTION OF THE INVENTION

Figure 3:
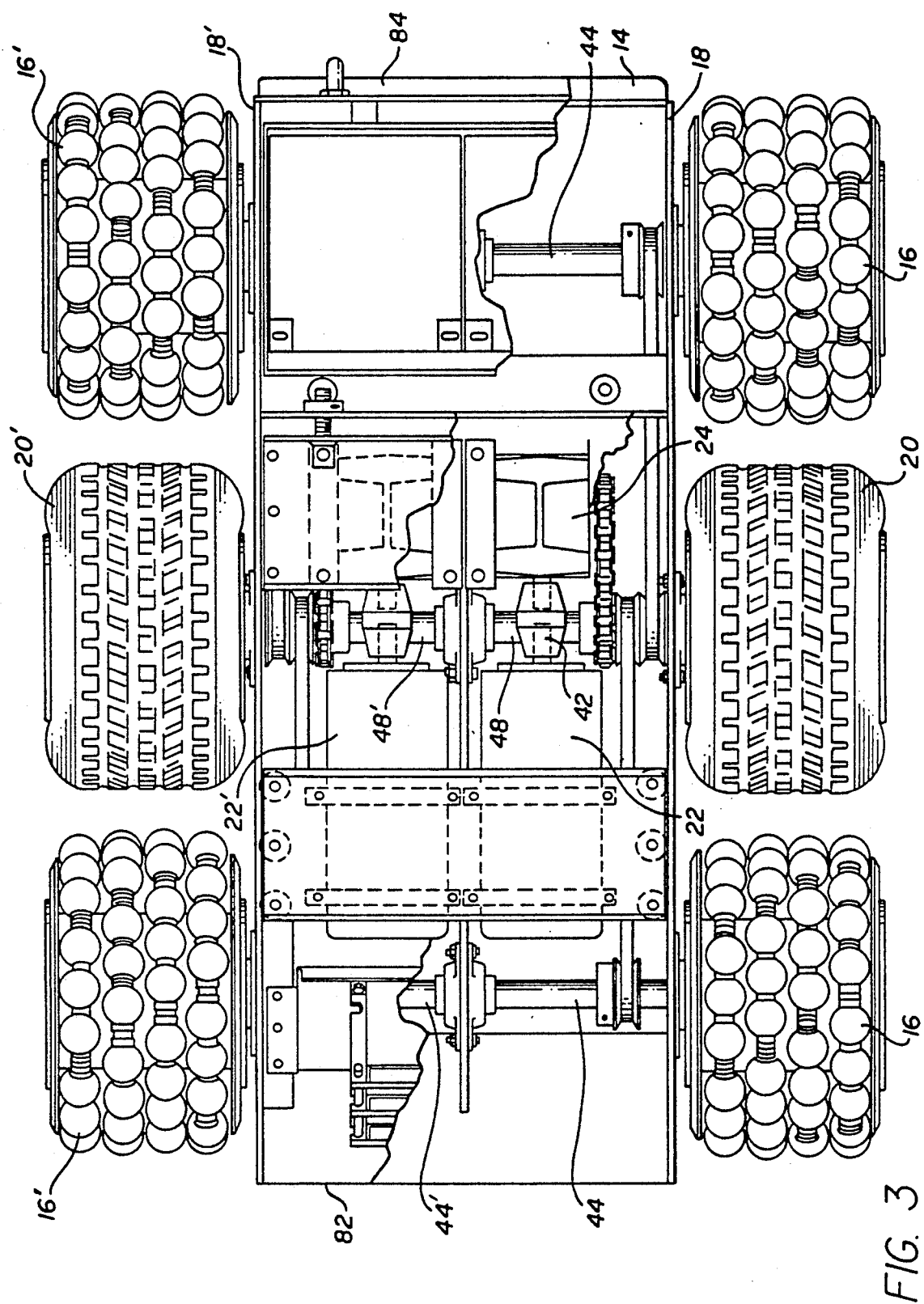
FIG. 3 is a cross-sectional view of the present invention platform taken along line 3—3 of FIG. 2

In the following description, numerous details such as specific materials and configurations are set forth in order to provide a more complete understanding of the present invention. But it is understood by those skilled in the art that the present invention can be practiced without those specific details. In other instances, well-known elements are not described explicitly so as not to obscure the invention.

The present invention relates to a transport platform utilizing a combination of omnidirectional wheels and conventional wheels to give mobility to the platform. In a preferred embodiment, the transport platform is adapted to carry a load such as a robot. FIG. 1 provides a pictorial perspective view of a preferred embodiment of the present invention. As shown here, the transport platform 10 serves as an undercarriage for a robot 12. Although the preferred embodiment is adapted for use with a robot 12, it is clear to a person skilled in the art that the transport platform 10 can be adapted to carry a variety of other loads. For instance, the present invention can be configured to operate as the undercarriage for an automobile or truck, replacing the conventional four wheels.

As best seen in FIG. 1, the preferred embodiment transport platform 10 has six wheels of which three wheels are disposed on each side. The three wheels on each side are aligned in a row, but this is of course not necessary; the distances between wheels on any given side and the distances between pairs of wheels on opposite sides can be varied according to need.

FIG. 2 is a sectional view of the preferred embodiment of the present invention taken along line 2—2 of FIG. 1. Aside from the platform 10, only the robot torso 80 and related hardware are shown. Clearly, robots of numerous other configurations known in the art can be adapted to mount to the platform 10. Hence no further discussion of the robot portion is necessary here.

In the preferred embodiment of FIG. 2, the transport platform 10 comprises a base 14 and six wheels, three wheels on each side. Two of the three wheels are omnidirectional wheels 16, which wheel structure is discussed in detail below. An intermediate wheel 20 is disposed between the two omnidirectional wheels 16. Each omnidirectional wheel 16 is mounted to an axle 44; likewise, the intermediate wheel 20 has its own axle 48. In the preferred embodiment, the axles 44, 48 are cog driven and torque is transferred to each axle 44, 48 by a chain 30 or by toothed drive belts 32. Input torque is supplied by an electric motor 22 to a gear box 24, which is coupled to the main drive cog 74. The toothed drive belts 32 are preferably made from a flexible material so in the event either omnidirectional wheel 16 is jammed, the toothed drive belt 32 easily slips out of drive engagement over the jammed wheel and thus avoids damage to the transmission or motor.

FIG. 3 is a sectional view taken along line 3—3 of FIG. 2. In FIG. 3, it is apparent that the three wheels and drive mechanisms described above are duplicated on each side 18 and 18' of the base 14. To be sure, the motor, wheels, gear box, chain, drive belts, cogs, etc. are duplicated for the opposite side 18'. For the sake of clarity, however, the discussion below focusses primarily on one side 18 of the platform 10 only. The discussion refers to the opposite side 18' only if necessary, and it is assumed that the structures described apply to either side.

It is also important to note in FIG. 3 that the axles 44, 48 are preferably not connected to the axles 44' and 48' of the opposing wheels 16', 20'. That is, the three wheels 16, 20 on one side 18 of the base 14 rotate independently of the three wheels 16', 20' on the opposite side 18'. By way of a modification, a conventional differential known in the art could be adapted to the present invention if necessary to coordinate rotational motion between opposing pairs of wheels.

The preferred embodiment uses torque generated from two DC drive motors 22, 22' that are each ¾ horsepower, 90 volt Needless to say, the motors 22, 22' can be of higher or lower output depending upon need. To facilitate connection between the output shaft of the motor 22 and the input to the gear box 24, the present invention employs a flexible motor coupling 42. This coupling 42 can be as simple as an interconnecting rubber tubing forced fit over the two shafts, a universal joint, or any other similar interconnecting device known in the art.

The gear box 24 is used as in any conventional drive mechanism, to primarily select gear ratios or to transfer torque from one direction to another. Since the gear box 24 and associated transmission hardware are conventional in design, no further discussion is required here.

As seen in FIGS. 2 and 3, the motor 22 can be controlled to operate in concert by a combination of power relays 34, servo amplifiers 40, and a radio receiver 36 for wireless remote control. The transport platform 10 is therefore servo controlled by, for example, a wireless transmitter commonly used to fly radio-controlled model airplanes. In the preferred embodiment, a pulse width modulation-DC converter 38 is used to process digital signals for control of the servos 40, which in turn control the power relays 34. Clearly, there are many other control systems that can accomplish the same purpose of controlling the motor and gear box, all well known in the art.

Power to the control system including relays and motors originates from upper and lower battery packs 26 and 28, respectively. The battery packs 26 and 28 are designed for easy removal. Depending upon electrical load demands, the battery packs 26, 28 can have a 24 volt or 96 volt output; the batteries can also be 26.0 amp per hour or 8.0 amp per hour. Of course the batteries 26, 28 can be of the rechargeable type too.

With the foregoing control equipment in operation, it is possible to coordinate the rotation of the various wheels. For example, in the preferred embodiment, an incoming radio signal is received by the radio receiver 36, which may have a digital output control signal that is interpreted by the PWM-DC converter 38, which converter 38 applies voltages to the power relays 34. Through operation of the power relays 34, various gear ratios can be selected as well as the rotational direction of the motors 22, 22', and their on/off status.

It is possible, therefore, to selectively drive any one or more of the three wheels 16, 20 on each side 18 of the base 14. Thus, for straight line travel, both motors 22 and 22' can be directed to rotate the wheels 16, 20, 16', 20' in the same direction. To achieve a pivoting maneuver, the motors 22, 22' and consequently the wheels can be instructed to rotate in opposite directions. As is known in the art, the motors 22, 22' can also be used to brake the wheels 16, 20, 16', 20' and overcome any moment of inertia for precise stopping maneuvers.

The present embodiment shown in FIGS. 2 and 3 does not incorporate a suspension system. Without a doubt, however, many suspension mechanisms known in the art can be easily added to the transport platform 10. For instance, each axle 44, 48 can be braced by leaf springs or coil springs and damped by pneumatic or hydraulic shock absorbers. Alternatively, the axles 44, 48 can be converted to have a torsion bar type suspension, known in the art. With those various suspension systems, it is possible for the present invention transport platform 10 to climb and traverse rough and uneven terrain.

Moreover, it is preferred that the present invention be powered by multiple electric motors 22, 22'. Of course, it is possible to replace the motors 22, 22' with internal combustion gas or diesel engines. It is also possible to drive just two wheels on each side 18 of the base 14; or if necessary, drive four or all six of the opposing pairs of wheels.

To enter a pivoting maneuver without causing the outboard wheels located at the outer extremes of the pivot arc to skid laterally, the present invention utilizes omnidirectional type wheels. As introduced above, the preferred embodiment has an omnidirectional wheel 16 near the fore end 82 and the aft end 84, separated by an intermediate wheel 20 positioned therebetween. The intermediate wheel 20, as already explained, is a conventional wheel.

Figure 4:
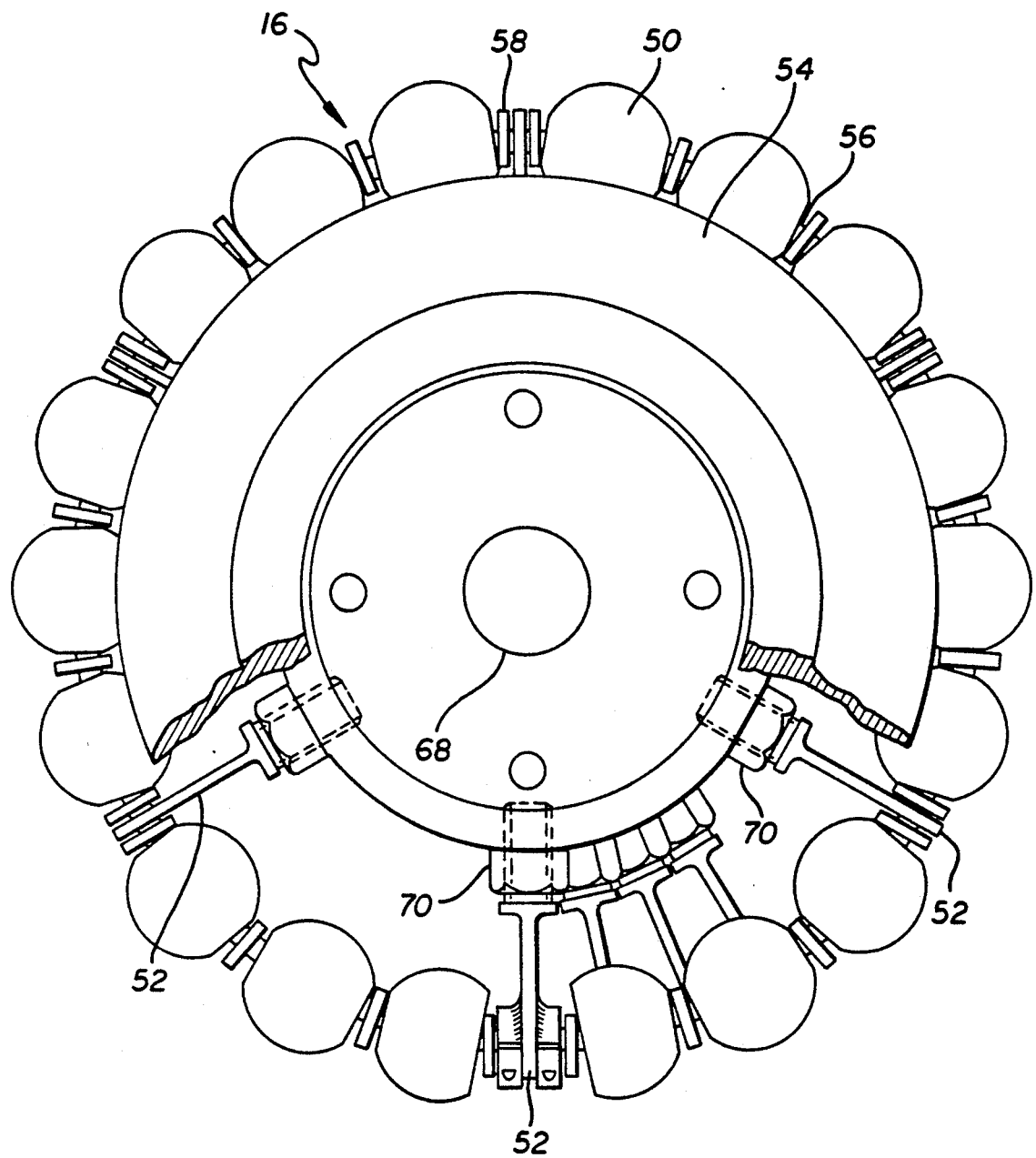
FIG. 4 of a side elevational view of a preferred embodiment omnidirectional wheel.
Figure 5:
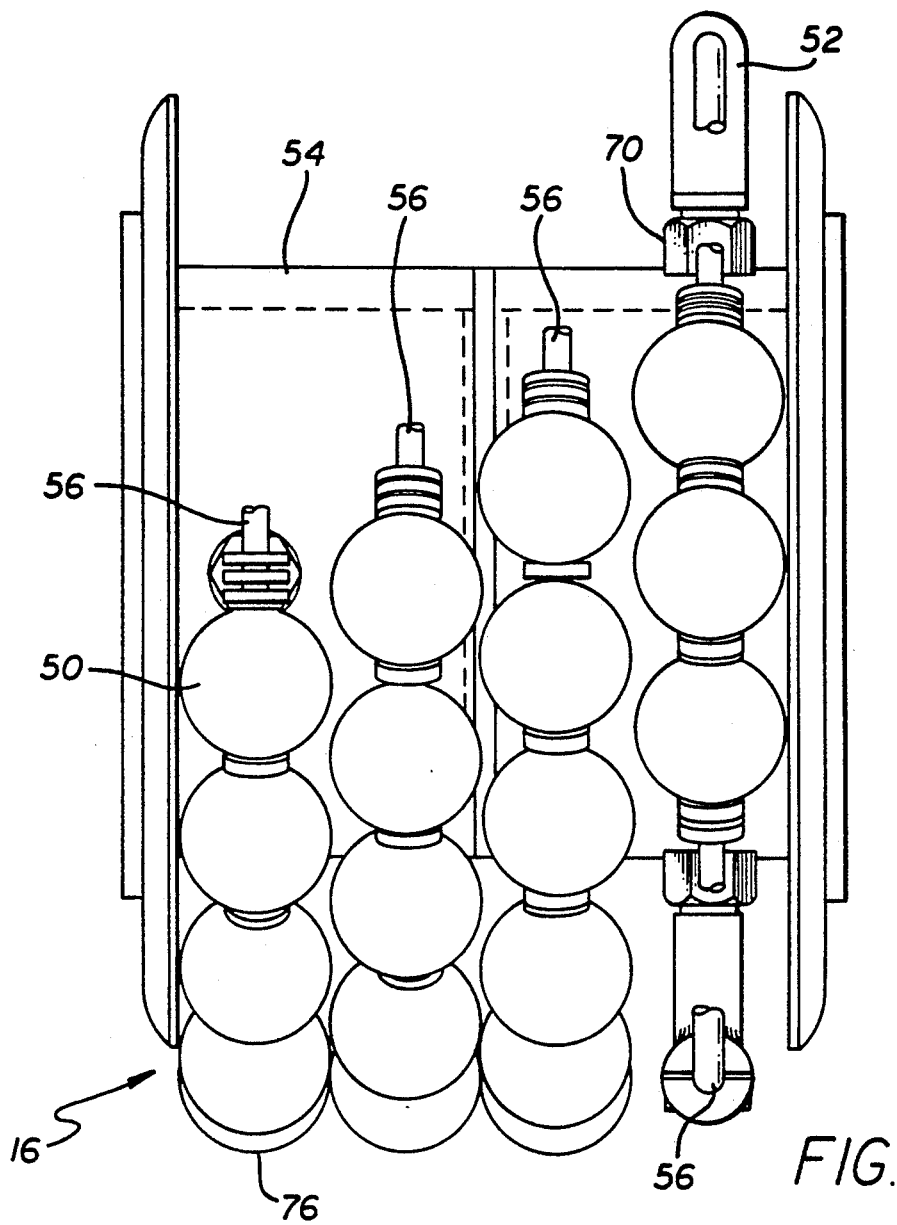
FIG. 5 is an end view of the preferred embodiment omnidirectional wheel.

FIGS. 4 and 5 illustrate the preferred embodiment omnidirectional wheel 16 from a side view and a front view, respectively. Generally speaking, the omnidirectional wheel 16 is comprised of a hub 54 and a plurality of rollers 50 which are disposed around the circumference of the hub 54. Actually, the rollers 50 are suspended in an overlying position circumscribing the hub 54, as shown in FIG. 4. As in a conventional wheel hub, the present invention hub 54 has a hole 68 adapted to receive the omnidirectional wheel axle 44, shown in FIG. 2.

In the preferred embodiment, the present invention provides spokes 52 extending radially from the hub 54. As illustrated in FIG. 4, the spokes 52 support an annular shaft 56 that circumscribes the hub 54. The annular shaft 56 should preferably be made from some rigid material and have a circular cross-section. Depending upon performance requirements such as rotational speed of the wheel, terrain on which the wheel travels, the size of the loads the wheel must bear, etc., one skilled in the art would use more or fewer spokes 52 and vary the dimensions as needed. In the preferred embodiment, the spokes 52 are simply mounted to the hub 54 by use of lock nuts 70.

Figure 6:
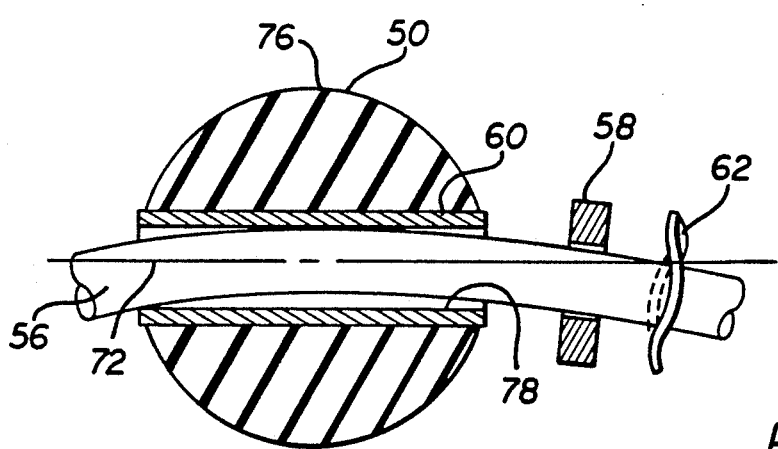
FIG. 6 provides a magnified, cross-sectional view of a single roller and its attachment to an annular shaft, taken along the roller's axis of rotation.

The rollers 50 are mounted to this annular shaft 56 as seen in either FIGS. 4 or 5. FIG. 6 provides a magnified, cross-sectional view of a single roller 50 and its attachment to the annular shaft 56, taken along the roller's axis of rotation. In the preferred embodiment, the present invention provides a spherical shaped roller 50. By varying the shape of the roller 50, the profile of the rolling surface 76 can be changed accordingly. The rolling surface 76 is that portion of the roller 50 that contacts the terrain. In the following three alternative embodiments, a cylindrical shape roller would provide a flat rolling surface, while a diamond shape roller would provide an angular or V-shape rolling surface, and an ovoid roller would provide an arcuate rolling surface.

The roller 50 has a through-hole 78 which is adapted to receive the annular shaft 56. To reduce friction between the two structures, a bushing 60 is used to line the through-hole 78. The bushing 60 should be made from a low friction nylon or like polymer.

To reduce friction generated between adjacent rollers 50, and to dampen the noise from their contact, the present invention uses thrust washers 58 and antirattle spring washers 62 between adjacent pairs of rollers 50.

Still in FIG. 6, the drawing shows the axis of rotation 72 for the roller 50. Importantly, this axis of rotation 72 is preferably tangential to an arc defined by the curved, annular shaft 56. The axis of rotation 72 is also preferably coplanar with the annular shaft 56. Therefore, as best seen in FIG. 5, the omnidirectional wheel 16 by virtue of the rollers 50 can slide laterally without skidding. During that maneuver, each roller 50 in contact with the ground or terrain rotates about its respective axis of rotation 72.

On the other hand, as shown in FIG. 4, if the wheel 16 rotates clockwise or counterclockwise as in a conventional wheel, each roller 50, being in contact with the ground or terrain, supplies traction in that direction. There is thus no rotation of the roller 50 along the same direction of rotation as the wheel 16 since each roller 50 is restrained by the annular shaft 56.

The present invention as shown in FIG. 5 has preferably four rows of rollers 50. That means there are four annular shafts 56 disposed on the hub 54. Naturally, it is possible to have more or fewer annular shafts 56 per hub 54, and it is possible to have more or fewer rollers 50 per shaft 56.

Importantly, the present invention staggers the rollers 50 relative to each other. Staggering the rollers 50 achieves two functions. First, there can be more rollers 50 packed per square unit area on the hub 54. Second, staggering the rollers 50 facilitates lateral motion of the omnidirectional wheel 16 and minimizes skidding in that direction. Specifically, during performance trials of prototype wheels, pivoting maneuvers of the transport platform 10 indicated that the rollers 50 arranged in a staggered relationship exerted the least amount of friction against the ground.

Accordingly, the preferred embodiment provides a simple construction of an omnidirectional wheel. The simplified construction leads to fewer parts and easier assembly. Also, the staggered roller arrangement of the present invention omnidirectional wheel is superior to the prior art in that there is very little friction generated during a pivoting maneuver of the transport platform to which it is mounted. Thus when combined with an intermediate wheel of a conventional design, the present invention transport platform achieves a high degree of maneuverability for precise spinning motion, start-stop motion, and the like.

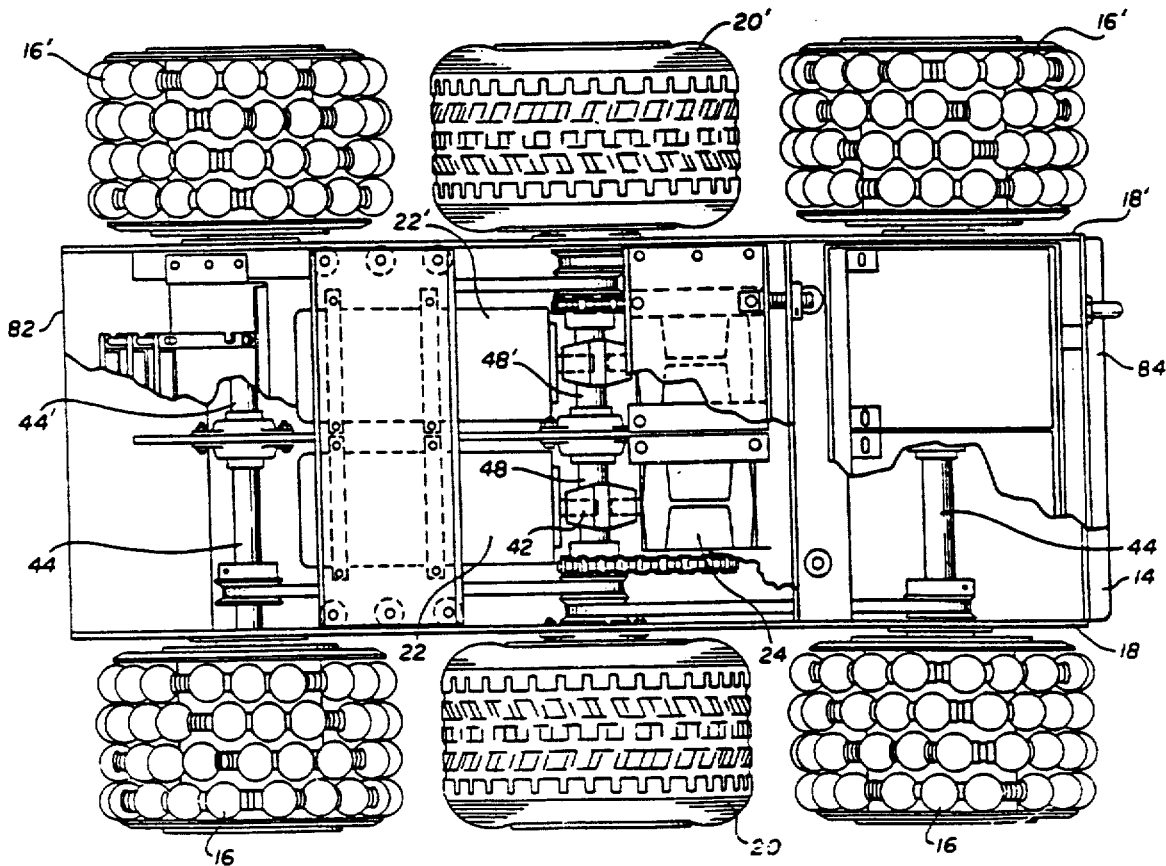

We claim:

1. A robot transport platform adapted for translation and pivotal motion over a running surface, comprising:
  a base having oppositely disposed sides, and a fore end and an aft end;
  a first pair of wheels disposed on opposite sides of the base toward the fore end of the base, each wheel having
    a cylindrical hub,
    a plurality of annular shafts each circumscribing the hub,
    spokes extending radially from the cylindrical hub to each annular shaft,
    spherical rollers rotatably mounted to each annular shaft,
    wherein the rollers are staggered from the rollers mounted on adjacent annular shafts;
  a second pair of wheels disposed on opposite sides of the base toward the aft end of the base;
  a pair of intermediate wheels disposed on opposite sides of the base in an intermediate position in between the first pair and second pair of wheels, wherein on each side of the base the first and second wheels and the intermediate wheel are mounted at a substantially constant height defined from a line extending parallel to the running surface;
  a motor disposed on the base;
  a gearbox for selectively engaging the intermediate wheels and first and second wheels, wherein the gearbox is driven by the motor;
  means for controlling the motor and gearbox including a pulse width modulation converter mounted to the base,
    a servo amplifier electrically connected to the pulse width modulation converter,
    power relays adapted to engage the gearbox and motor,
    means for receiving a signal, electrically connected to the pulse width modulation converter; and a power cell connected to the means for controlling.

2. A robot transport platform adapted for locomotion, comprising:
  a base having oppositely disposed sides, and a fore end and an aft end;
  a first pair of first and second wheels disposed on opposite sides of the base toward the fore and aft ends of the base respectively, wherein each wheel includes
    a cylindrical shape hub,
    a plurality of annular shafts disposed concentricity with the hub and arranged in an overlying position relative to the hub,
    radially extending spokes joining the annular shafts to the hub, wherein rollers are rotatably mounted to each annular shaft in a staggered relationship;
  a pair of intermediate wheels disposed on opposite sides of the base in between the first pair and second pair of wheels;
  drive means for selectively driving the wheels; and
  means for controlling the drive means.

3. A transport platform adapted for locomotion of a load comprising:
  means for supporting the load having opposite sides;
  at least two wheels disposed on each side of the means for supporting, each wheel having
    a cylindrical hub including a circumference,
    a plurality of annular shafts disposed concentrically with the hub and arranged in an overlying position relative to the hub,
    radially extending spokes joining the annular shafts to the hub, wherein rollers are rotatably mounted to each annular shaft in a staggered relationship;
  propulsion means for propelling the means for supporting, disposed on opposite sides in an intermediate position in between the wheels on each side of the means for supporting; and
  means for controlling the propulsion means.

* * * * *

UNITED STATES PATENT AND TRADEMARK OFFICE
CERTIFICATE OF CORRECTION

PATENT NO. : 5,323,867
DATED : June 28, 1994
INVENTOR(S) : Eric J. Allard, et al.

It is certified that error appears in the above-indentified patent and that said Letters Patent is hereby corrected as shown below:

The title page should be deleted to appear as per attached title page.

Signed and Sealed this

Twentieth Day of September, 1994

Attest:

BRUCE LEHMAN

*Attesting Officer*     *Commissioner of Patents and Trademarks*

United States Patent [19]

Allard et al.

[11] Patent Number: 5,323,867
[45] Date of Patent: Jun. 28, 1994

[54] ROBOT TRANSPORT PLATFORM WITH MULTI-DIRECTIONAL WHEELS

[75] Inventors: Eric J. Allard, 17614 Lahey St., Granada Hills, Calif. 91344
Ronald Griffin, Agua Dulce, Calif.

[73] Assignee: Eric J. Allard, Granada Hills, Calif.

[21] Appl. No.: 847,627

[22] Filed: Mar. 6, 1992

[51] Int. Cl.$^5$ .......................... B62D 5/02; B62D 11/08
[52] U.S. Cl. ...................................... 180/22; 301/5.023
[58] Field of Search .................. 180/7.1, 22, 6.2, 6.54, 180/6.48; 301/5.23, 5.1, 1; 305/60, 6, 7

[56] References Cited

U.S. PATENT DOCUMENTS

| | | | |
|---|---|---|---|
| 1,305,535 | 6/1919 | Grabowiecki | 301/5.23 |
| 3,465,843 | 9/1969 | Guinot | 301/5.23 |
| 3,789,947 | 2/1974 | Blumrich | 301/5.23 |
| 4,101,004 | 7/1978 | Oltman | 180/6.2 |
| 4,168,468 | 9/1979 | Mabuchi et al. | 180/6.5 |
| 4,335,899 | 6/1982 | Hiscock | 301/5.23 |
| 4,621,562 | 11/1986 | Carr et al. | 180/6.48 |
| 4,823,900 | 4/1989 | Farnam | 301/5.23 |

Primary Examiner—Edwin L. Swinehart
Attorney, Agent, or Firm—Jeffrey J. Blatt

[57] ABSTRACT

A robot transport platform adapted for locomotion, having a base with three wheels on each side. Of the three wheels on each side, the wheels near the fore end and the aft end are omnidirectional wheels; the intermediate wheel in between the omnidirectional wheels is a conventional wheel. The omnidirectional wheels have staggered rows of spherical rollers rotatably mounted to the circumference of the wheel's hub. More precisely, the rollers are mounted to annular shafts that circumscribe the circumference of the hub, and are supported in an overlying position over the hub by radially extending spokes. Anti-rattle washers are provided in between adjacent rollers. Torque is provided by two electric motors independently operating the wheels on each side. Torque is transferred to the wheels via a gear box, a chain, and cogged drive belts. The robot transport platform is controlled by radio and accordingly has a radio receiver mounted to the base. Servo controllers are used to control the motors and gear box. Batteries are supplied to power the electrical hardware. In alternative embodiments, the shape of the rollers can be cylindrical, diamond shaped, or an ovoid. In another alternative embodiment, the transport platform can be powered by an internal combustion gasoline or diesel engine.

3 Claims, 4 Drawing Sheets